(12) United States Patent
Diokno et al.

(10) Patent No.: US 12,369,617 B2
(45) Date of Patent: Jul. 29, 2025

(54) METAL OXIDE-BASED GEL NICOTINE COMPOSITIONS

(71) Applicant: JUUL Labs, Inc., San Francisco, CA (US)

(72) Inventors: Kristopher P. Diokno, San Jose, CA (US); Namhey Lee, Hayward, CA (US); Christopher W. Lim, Fremont, CA (US)

(73) Assignee: JUUL Labs, Inc., Washington, DC (US)

( * ) Notice: Subject to any disclaimer, the term of this patent is extended or adjusted under 35 U.S.C. 154(b) by 439 days.

(21) Appl. No.: 17/845,350

(22) Filed: Jun. 21, 2022

(65) Prior Publication Data

US 2022/0312829 A1 Oct. 6, 2022

Related U.S. Application Data

(63) Continuation of application No. PCT/US2020/065490, filed on Dec. 17, 2020.

(60) Provisional application No. 63/016,133, filed on Apr. 27, 2020, provisional application No. 62/950,790, filed on Dec. 19, 2019.

(51) Int. Cl.
| | |
|---|---|
| *A24B 15/167* | (2020.01) |
| *A24B 15/24* | (2006.01) |
| *A24B 15/28* | (2006.01) |
| *A24F 40/10* | (2020.01) |
| *B01J 13/00* | (2006.01) |

(52) U.S. Cl.
CPC .......... *A24B 15/243* (2013.01); *A24B 15/167* (2016.11); *A24B 15/287* (2013.01); *A24F 40/10* (2020.01); *B01J 13/0052* (2013.01)

(58) Field of Classification Search
CPC ... B01J 13/0052; A24B 15/167; A24B 15/287
See application file for complete search history.

(56) References Cited

U.S. PATENT DOCUMENTS

| | | | |
|---|---|---|---|
| 2,162,738 A | 6/1939 | McCoy | |
| 2,938,818 A | 5/1960 | Specht | |
| 3,012,915 A | 12/1961 | Howard | |
| 3,847,326 A | 11/1974 | Webster | |
| 3,880,172 A | 4/1975 | Anderson et al. | |
| 5,525,351 A | 6/1996 | Dam | |
| 6,344,222 B1 | 2/2002 | Cherukuri et al. | |
| 7,040,314 B2 | 5/2006 | Nguyen et al. | |
| 7,581,540 B2 | 9/2009 | Hale et al. | |
| 8,356,606 B2 | 1/2013 | Sengupta et al. | |
| 8,402,978 B2 | 3/2013 | Karles et al. | |
| 8,485,180 B2 | 7/2013 | Smutney et al. | |
| 8,741,348 B2 | 6/2014 | Hansson et al. | |
| 8,893,724 B2 | 11/2014 | Woodcock et al. | |
| 10,195,345 B2 | 2/2019 | Senior et al. | |
| 10,328,443 B2 | 6/2019 | Ricketts et al. | |
| 10,609,958 B2 | 4/2020 | Robinson et al. | |
| 10,856,573 B2 | 12/2020 | Pijnenburg et al. | |
| 10,952,452 B2 | 3/2021 | Sengupta et al. | |
| 11,053,395 B2 | 7/2021 | Karles et al. | |
| 11,246,344 B2 | 2/2022 | Griffith, Jr. et al. | |
| 11,259,569 B2 | 3/2022 | Hejazi | |
| 2005/0056294 A1 | 3/2005 | Wanna et al. | |
| 2006/0171990 A1* | 8/2006 | Asgari ................. | B01J 13/0091 264/4.1 |
| 2010/0006092 A1 | 1/2010 | Hale et al. | |
| 2011/0232657 A1 | 9/2011 | Karles et al. | |
| 2012/0152264 A1 | 6/2012 | Coleman et al. | |
| 2012/0199149 A1 | 8/2012 | Strickland et al. | |
| 2013/0255702 A1 | 10/2013 | Griffith, Jr. et al. | |
| 2015/0013693 A1 | 1/2015 | Fuisz et al. | |
| 2015/0068545 A1 | 3/2015 | Moldoveanu et al. | |
| 2016/0136153 A1 | 5/2016 | Jenkins | |
| 2016/0295910 A1 | 10/2016 | Besso et al. | |
| 2017/0071249 A1 | 3/2017 | Ampolini et al. | |
| 2017/0099877 A1 | 4/2017 | Worm et al. | |
| 2017/0251714 A1 | 9/2017 | Mishra et al. | |
| 2017/0265517 A1 | 9/2017 | Swede et al. | |
| 2017/0340005 A1 | 11/2017 | Terao | |
| 2018/0029782 A1 | 2/2018 | Zuber et al. | |
| 2018/0042302 A1 | 2/2018 | Robinson et al. | |
| 2018/0084823 A1 | 3/2018 | Fuisz et al. | |
| 2018/0199617 A1 | 7/2018 | Iodice | |
| 2018/0228203 A1 | 8/2018 | Pithawalla et al. | |
| 2018/0310624 A1 | 11/2018 | Parker et al. | |
| 2019/0183177 A1* | 6/2019 | Hubbard ............... | A61M 15/06 |
| 2022/0312841 A1 | 10/2022 | Diokno et al. | |

FOREIGN PATENT DOCUMENTS

| | | |
|---|---|---|
| CA | 622523 A | 6/1961 |
| CN | 102316850 A | 1/2012 |
| CN | 108277085 A | 7/2018 |
| CN | 108366614 A | 8/2018 |
| CN | 109105944 A | 1/2019 |
| CN | 109310622 A | 2/2019 |
| CN | 111685388 A | 9/2020 |
| EP | 0135265 A2 | 3/1985 |
| EP | 0405190 A2 | 1/1991 |
| EP | 0509657 A1 | 10/1992 |
| EP | 0419974 B1 | 12/1996 |
| EP | 2077731 B1 | 8/2011 |
| EP | 2205105 B1 | 9/2012 |

(Continued)

OTHER PUBLICATIONS

Chan, et al. (May 2009), Prediction Models for Shape and Size of ca-Alginate Macrobeads Produced Through Extrusion-Dripping Method, Journal of Colloid and Interface Science 338(1):63-72.

*Primary Examiner* — Eric Yaary

(74) *Attorney, Agent, or Firm* — Mintz, Levin, Cohn, Ferris, Glovsky and Popeo, P.C.

(57) ABSTRACT

Provided herein, inter alia, are compositions including sol-gels and nicotine. The compositions are readily prepared and stored in cartridges or used directly in a device for delivering nicotine to a user.

19 Claims, No Drawings

(56) References Cited

FOREIGN PATENT DOCUMENTS

| | | | |
|---|---|---|---|
| EP | 2645886 | B1 | 4/2015 |
| EP | 2753197 | B1 | 9/2015 |
| EP | 2552237 | B1 | 10/2016 |
| EP | 2844088 | B1 | 11/2016 |
| EP | 2741625 | B1 | 4/2017 |
| EP | 2811849 | B1 | 4/2018 |
| EP | 2552248 | B1 | 9/2019 |
| EP | 2632562 | B1 | 8/2020 |
| EP | 3089602 | B1 | 9/2020 |
| EP | 3110264 | B1 | 9/2020 |
| EP | 3481237 | B1 | 9/2020 |
| EP | 3297460 | B1 | 12/2020 |
| EP | 3110265 | B1 | 2/2021 |
| EP | 3240442 | B1 | 2/2022 |
| EP | 3240439 | B1 | 6/2022 |
| EP | 3911390 | B1 | 10/2022 |
| EP | 3846643 | B1 | 11/2022 |
| EP | 3846644 | B1 | 11/2022 |
| EP | 3860376 | B1 | 5/2023 |
| GB | 1484573 | A | 9/1977 |
| KR | 10-2016-0004298 | A | 1/2016 |
| KR | 10-2019-0083314 | A | 7/2019 |
| WO | WO-9312675 | A2 | 7/1993 |
| WO | WO-9520330 | A1 | 8/1995 |
| WO | WO-9530411 | A1 | 11/1995 |
| WO | WO-2005007068 | A1 | 1/2005 |
| WO | WO-2012026963 | A2 | 3/2012 |
| WO | WO-2012134380 | A1 | 10/2012 |
| WO | WO-2013030202 | A1 | 3/2013 |
| WO | WO-2015179388 | A1 | 11/2015 |
| WO | WO-2015193242 | A2 | 12/2015 |
| WO | WO-2015197674 | A1 | 12/2015 |
| WO | WO-2017046363 | A1 | 3/2017 |
| WO | WO-2017075975 | A1 | 5/2017 |
| WO | WO-2018122375 | A1 | 7/2018 |
| WO | WO-2018224339 | A1 | 12/2018 |
| WO | WO-2019015339 | A1 | 1/2019 |
| WO | WO-2019048880 | A1 | 3/2019 |
| WO | WO-2019071910 | A1 | 4/2019 |
| WO | WO-2019086859 | A1 | 5/2019 |
| WO | WO-2019129843 | A1 | 7/2019 |
| WO | WO-2019193209 | A1 | 10/2019 |
| WO | WO-2019193311 | A1 | 10/2019 |
| WO | WO-2020025718 | A1 | 2/2020 |
| WO | WO-2021026443 | A1 | 2/2021 |

* cited by examiner

METAL OXIDE-BASED GEL NICOTINE COMPOSITIONS

CROSS-REFERENCE TO RELATED APPLICATIONS

The present application is a continuation of International Patent Application No. PCT/US2020/065490 entitled "Metal Oxide-Based Gel Nicotine Compositions," with an International Filing Date of Dec. 17, 2020, which claims priority to U.S. Provisional Patent Application No. 63/016,133 entitled "Metal Oxide-Based Gel Nicotine Compositions," filed on Apr. 27, 2020, and to U.S. Provisional Patent Application No. 62/950,790 entitled "Metal Oxide-Based Gel Nicotine Compositions," filed on Dec. 19, 2019, each of which is incorporated herein by reference in its entirety.

BACKGROUND

The present disclosure relates to compositions for use in electronic vapor devices. In particular, the present disclosure relates to metal oxide-based gel compositions and their use in electronic vapor devices.

Vaporizer devices, which can also be referred to as vaporizers, electronic vaporizer devices or e-vaporizer devices, can be used for delivery of an aerosol (or "vapor") containing one or more active ingredients by inhalation of the aerosol by a user of the vaporizing device. For example, electronic nicotine delivery systems (ENDS) include a class of vaporizer devices that are battery powered and that may be used to simulate the experience of smoking, but without burning of tobacco or other substances.

In use of a vaporizer device, the user inhales an aerosol, commonly called vapor, which may be generated by a heating element that vaporizes (e.g., causing a liquid or solid to at least partially transition to the gas phase) a vaporizable material, which may be liquid, a solution, a solid, a wax, or any other form as may be compatible with use of a specific vaporizer device. The vaporizable material used with a vaporizer can be provided within a cartridge (e.g., a separable part of the vaporizer that contains the vaporizable material in a reservoir) that includes a mouthpiece (e.g., for inhalation by a user).

A typical approach by which a vaporizer device generates an inhalable aerosol from a vaporizable material involves heating the vaporizable material in a vaporization chamber (or a heater chamber) to cause the vaporizable material to be converted to the gas (or vapor) phase. A vaporization chamber generally refers to an area or volume in the vaporizer device within which a heat source (e.g., conductive, convective, and/or radiative) causes heating of a vaporizable material to produce a mixture of air and vaporized vaporizable material to form a vapor for inhalation by a user of the vaporization device.

Various vaporizable materials having a variety of contents and proportions of such contents can be contained in the cartridge. Some vaporizable materials, for example, may have a smaller percentage of active ingredients per total volume of vaporizable material, such as due to regulations requiring certain active ingredient percentages. As a result, a user may need to vaporize a large amount of vaporizable material (e.g., compared to the overall volume of vaporizable material that can be stored in a cartridge) to achieve a desired effect.

A common issue encountered in vapor devices is the deposition of residue on the heating element created through degradation during heating. Such residues can build up and cause fouling of the heating element decreasing its lifespan and/or requiring extensive maintenance on the part of the user of the device. The fouling issue can be sufficiently problematic that some commercial device heating elements are part of disposable portions of the vapor device system. These disposable portions can include, for example, cartridges that contain the vaporizable materials along with the heating element. Thus, the entire cartridge, along with the heating element, is simply thrown away after a period of use. Devices that rely on changing the heating element in disposable cartridges are wasteful, inconvenient and can be expensive.

Some attempts to prolong the life of the heating element have employed pyrolysis as a cleaning mechanism. Such devices clean the heating element surface by increasing the temperature of the element to about 1,000° C. thereby burning off the residue. Operating at pyrolysis temperatures can be dangerous and is a power drain taxing the device battery, thereby requiring frequent battery changes.

Other attempts to prolong the life of the heating element employ manual cleaning of the element's surface at the user's discretion and frequency of cleaning may depend on the user's tolerance to flavor change and visual satisfaction. Alcohol has been used for cleaning, but does not remove all the residue. Moreover, such cleaning options are time-consuming and remaining residue can be the source of toxic byproduct formation on further heating.

Still other solutions for prolonging heating element lifespan have employed convection heating. However, a convection heater generally has low energy efficiency and typically requires a bigger battery, resulting in a heavier and larger device. In such devices, heating occurs while vaping thereby requiring a longer air channel for the hot air to cool down before it reaches the user's mouth. Such devices also commonly require a preheating time.

Provided herein are solutions to these and other problems in the art.

SUMMARY

In some aspects, embodiments herein relate to compositions including a sol-gel matrix and nicotine or a salt thereof dispersed within the sol-gel matrix.

In some aspects, embodiments herein relate to compositions made by a process including providing a sol-gel matrix precursor and adding a solution of nicotine to the sol-gel matrix precursor, where the sol-gel matrix precursor, the solution of nicotine, or both comprise water.

In some aspects, embodiments herein relate to cartridges for use in a device for delivery of nicotine or salt thereof to a user, the cartridge including a composition, as disclosed herein.

In some aspects, embodiments herein relate to devices including a heating element configured to heat a composition, as disclosed herein, to deliver nicotine or salt thereof to a user.

DETAILED DESCRIPTION

I. General

Embodiments herein provide compositions including a sol-gel matrix and nicotine or a salt thereof dispersed within the sol-gel matrix. The compositions may provide properties that enable the creation of a durable (long-term reusable) heating element. In embodiments, the compositions disclosed herein leave little to no residue on the surface of a heating element. In embodiments, the sol-gel compositions disclosed herein may exhibit thermal stability of up to 1700° C. (for the metal oxide (sol-gel) portion itself), though operating temperatures do not approach such temperatures. In embodiments, the compositions do not leave a blackened or charred mass on a surface of a cartridge or heating element of an electronic cigarette device.

In embodiments, the compositions disclosed herein offer high thermal stability against degradation and thus, the heating element surface may have substantially no residue after each usage. Accordingly, in embodiments, when using the compositions disclosed herein the user need not clean or dispose of the heating element for substantially longer periods of time compared to conventional devices.

In embodiments, the lack of visible residue in preliminary use experiments with the compositions disclosed herein suggest that devices employing the compositions may be more convenient for the user obviating the need for cleaning and reducing waste. In embodiments, the use of the compositions herein may increase energy efficiency while reducing device-associated costs.

In embodiments, compositions disclosed herein may be provided in a convenient format such as spooled on a tape-like substrate. For example, the compositions may be disposed on spooled cotton or paper mesh, or the like. In embodiments, the composition may be cut in small pieces to be disposed in conductive contact with the heating element.

Such a system benefits from the lack of plastic usage and all components may be biodegradable.

Those skilled in the art will appreciate these and other advantages of the embodiments disclosed herein.

II. Definitions

As used herein "a," "an," or "the" not only include aspects with one member, but also include aspects with more than one member. For instance, the singular forms "a," "an," and "the" include plural referents unless the context clearly dictates otherwise. Thus, for example, reference to "a polysaccharide" includes a plurality of such polysaccharides and reference to "the crosslinker" includes reference to one or more crosslinkers known to those skilled in the art, and so forth.

As used herein, the term "about," is intended to qualify the numerical values that it modifies, denoting such a value as variable within a margin of error. When no particular margin of error is assigned, such as a standard deviation to a mean value, the term "about" should be understood to mean that range which would encompass the recited value and the range which would be included by rounding up or down to that figure, taking into account significant figures.

As used herein, "gel" is used in accordance with its ordinary meaning. The IUPAC provides guidance: a gel is a non-fluid colloidal network or polymer network that is expanded through its whole volume by a fluid. *IUPAC. Compendium of Chemical Terminology, 2nd ed. (the "Gold Book"). Compiled by A. D. McNaught and A. Wilkinson. Blackwell Scientific Publications, Oxford* (1997). A gel network is typically characterized as having regions of local order. In aqueous media, the gel is typically referred to as a "hydrogel." This contrasts with gels in organic solvent systems "organogels" or where solvent is substantially removed, "xerogels."

"Sol-gel," as used herein refers to a metal oxide gel network including a polymeric backbone structure including a metal-oxygen-metal [M-O-M] motif. The metal-oxygen-metal motif may include metal bond valencies not engaged in the M-O-M motif, in which case valencies may be occupied by hydroxy groups, alkoxy groups, or both. An exemplary structure is shown as formula I:

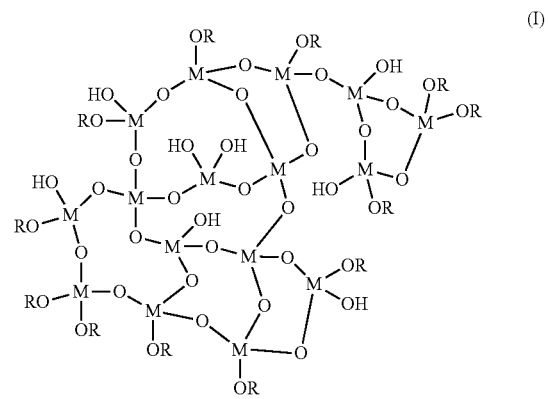

(I)

where R is an alkyl group and M is a metal such as silicon, titanium, aluminum, and zirconium, or mixtures of different M throughout the polymer network. As indicated in formula I, a given metal may be fully engaged in the polymer network such that all four valencies on a given M are occupied with an oxygen bonded to a neighboring M. There may be M with metal valencies filled by a single hydroxy, a single alkoxy and the remaining valencies occupied by oxides engaged in the M-O-M matrix. There may also be M with metal valencies filled by two hydroxys, two alkoxys, or one alkoxy and one hydroxy. The network may be characterized by a particular density and or pore size of the gel network, which properties may depend on the metal precursor reagents employed, including the choice of metal itself (or mixture of metals) and any organic alkoxide ligands in the precursor reagent. For example, the longer the carbon chain of an alkoxide ligand on a metal alkoxide precursor, the more porous the gel matrix due to steric hindrance during the polymerization process. Sol-gels can be generated from metal tetraalkoxides, metal tetrahalides and mixed metal alkoxide halides, as well as mixtures of these precursors in a process known as the sol-gel process. The process is typically carried out in water or mixed water organic alcohol systems in the presence of one or more acid or base catalysts.

As used herein, "nicotine" refers to both its free base and salt form. The salt form is typically generated by adding an organic acid to nicotine, although inorganic acids such as hydrochloric acid, hydrobromic acid, sulfuric acid, phosphoric acid, may also be used to form salts. Organic acids include, without limitation, benzoic acid, pyruvic acid, salicylic acid, levulinic acid, malic acid, succinic acid, and citric acid.

The term "electronic cigarette" or "e-cigarette" or "low temperature vaporization device" as used herein, refers to an electronic inhaler that vaporizes a portion of the gel compositions disclosed herein into an aerosol mist, simulating the act of tobacco smoking. There are many electronic cigarettes which do not resemble conventional cigarettes at all. The amount of nicotine contained can be chosen by the user via the inhalation. In general, an electronic cigarette contains three components: a plastic cartridge that serves as a mouthpiece and a containing means for the compositions herein, an "atomizer" that vaporizes the compositions, and a battery.

III. Compositions

In embodiments, there are provided compositions including a sol-gel matrix and nicotine or a salt thereof dispersed within the sol-gel matrix. In embodiments, the sol-gel matrix comprises a metal oxide. In embodiments, compositions disclosed herein may be characterized by physical properties including, without limitation, swellability, density, porosity and the like. Those skilled in the art will recognize that the exact gel properties may depend on materials used to make the sol gel polymer including, without limitation, the selection of metal or metals, and any ligands that are present on the metal oxide precursor.

In embodiments, the sol-gel matrix has a density of about 0.5 g/cm$^3$ to about 1.5 g/cm$^3$. In embodiments, the sol-gel matrix has a density of about 0.5 g/cm$^3$ to about 1.3 g/cm$^3$, or the sol-gel matrix has a density of about 0.7 g/cm$^3$ to about 1.3 g/cm$^3$, or the sol-gel matrix has a density of about 0.7 g/cm$^3$ to about 1.1 g/cm$^3$, including any sub-range in between and fractions thereof.

In embodiments, the composition is provided in an aqueous solution. In embodiments, the composition is provided in an e-liquid. E-liquid compositions typically combine one or more humectants, such as propylene glycol, glycerin, and mixtures thereof. In embodiments, the glycerin may be vegetable glycerin.

In embodiments the sol-gel matrix is derived from a silicon-containing precursor. In embodiments, the silicon-containing precursor is selected from the group consisting of a silicon alkoxide, a silicon halide, and/or a mixed silicon alkoxide halide, including combinations thereof. In embodiments, the silicon containing precursor is a tetraalkoxysilane. In embodiments, the silicon tetralkoxide is selected from the group consisting of tetramethoxysilane, tetraethoxysilane, and tetrapropoxysilane. In embodiments, the silicon halide is tetrachlorosilane. In embodiments, the silicon containing precursor may be a silane having the general formula (II): $(RO)_m SiX_n$, where m and n are integers each independently selected from 0 to 4, where the total of m plus n is 4, R is a substituted or unsubstituted alkyl group and X is a halogen. In embodiments, R is an unsubstituted alkyl group. In embodiments, where R is substituted, R is substituted with a substituent group, as defined below.

The term "alkyl," refers to a straight-chain or branched-chain alkyl radical (e.g., containing from 1 to 20 carbon atoms). In embodiments, the alkyl may comprise from 1 to 10 carbon atoms. In embodiments, the alkyl may comprise from 1 to 6 carbon atoms, or in embodiments, from 1 to 4 carbon atoms. In embodiments, the alkyl group may contain from 1 to 2 carbon atoms. Alkyl can include any number of carbons, such as $C_{1-2}$, $C_{1-3}$, $C_{1-4}$, $C_{1-5}$, $C_{1-6}$, $C_{1-7}$, $C_{1-8}$, $C_{1-9}$, $C_{1-10}$, $C_{2-3}$, $C_{2-4}$, $C_{2-5}$, $C_{2-6}$, $C_{3-4}$, $C_{3-5}$, $C_{3-6}$, $C_{4-5}$, $C_{4-6}$ and $C_{5-6}$. For example, $C_{1-6}$ alkyl includes, but is not limited to, methyl, ethyl, propyl, isopropyl, butyl, isobutyl, sec-butyl, tert-butyl, pentyl, isopentyl, hexyl, and so on. In embodiments, R is methyl, ethyl, propyl, isopropyl, butyl, isobutyl, sec-butyl, tert-butyl, pentyl, isopentyl or hexyl. In embodiments, R is methyl. In embodiments, R is ethyl.

A "substituent group," as used herein, means a group selected from the following moieties: (A) oxo, halogen, $CCl_3$, $-CBr_3$, $-CF_3$, $-CI_3$, $-CH_2Cl$, $-CH_2Br$, $-CH_2F$, $-CH_2I$, $-CHCl_2$, $-CHBr_2$, $-CHF_2$, $-CHI_2$, $-CN$, $-OH$, $-NH_2$, $-COOH$, $-CONH_2$, $-NO_2$, $-SH$, $-SO_3H$, $-SO_4H$, $-SO_2NH_2$, $-NHNH_2$, $-ONH_2$, $-NHC(O)NHNH_2$, $-NHC(O)NH_2$, $-NHSO_2H$, $-NHC(O)H$, $-NHC(O)OH$, $-NHOH$, $-OCCl_3$, $-OCF_3$, $-OCBr_3$, $-OCI_3$, $-OCHCl_2$, $-OCHBr_2$, $-OCHI_2$, $-OCHF_2$, $-PO_3H$, $-PO_4H$, $-N_3$, unsubstituted alkyl (e.g., $C_1$-$C_8$ alkyl, $C_1$-$C_6$ alkyl, or $C_1$-$C_4$ alkyl), unsubstituted heteroalkyl (e.g., 2 to 8 membered heteroalkyl, 2 to 6 membered heteroalkyl, or 2 to 4 membered heteroalkyl), unsubstituted cycloalkyl (e.g., $C_3$-$C_8$ cycloalkyl, $C_3$-$C_6$ cycloalkyl, or $C_5$-$C_6$ cycloalkyl), unsubstituted heterocycloalkyl (e.g., 3 to 8 membered heterocycloalkyl, 3 to 6 membered heterocycloalkyl, or 5 to 6 membered heterocycloalkyl), unsubstituted aryl (e.g., $C_6$-$C_{10}$ aryl, $C_{10}$ aryl, or phenyl), or unsubstituted heteroaryl (e.g., 5 to 10 membered heteroaryl, 5 to 9 membered heteroaryl, or 5 to 6 membered heteroaryl).

In embodiments, each R is, independently, a substituted or unsubstituted $C_1$-$C_{20}$ alkyl. I In embodiments, each R is, independently, a substituted or unsubstituted $C_1$-$C_8$ alkyl. In embodiments, each R is, independently, a substituted or unsubstituted $C_1$-$C_4$ alkyl. In embodiments, each R is, independently, a $C_1$-$C_2$ alkyl.

In embodiments, R is a hydroxy-substituted $C_1$-$C_4$ alkyl group.

In embodiments, n is 1, in embodiments, n is 2. In embodiments, n is 3. In embodiments, n is 4. In embodiments, m is 1. In embodiments m is 2. In embodiments, m is 3. In embodiments, m is 4. In embodiments, m is 4 and n is 0. In embodiments, m is 0 and n is 4. In embodiments, m is 3 and n is 1. In embodiments, m is 1 and n is 3. In embodiments, m is 2 and n is 2.

The term "halogen," as used herein, refers to fluorine, chlorine, bromine, or iodine. In embodiments, X is chlorine.

In embodiments, the sol-gel matrix is derived from a titanium-containing precursor. In embodiments, the titanium-containing precursor is selected from the group consisting of titanium tetraethoxide, titanium tetraisopropoxide, titanium tetrabutoxide, titanium oxide sulfate hydrate, and titanium tetrachloride. In embodiments, the titanium containing precursor may have the general formula (III): $(RO)_m TiX_n$, where m and n are integers each independently selected from 0 to 4, where the total of m plus n is 4, R is an alkyl group and X is a halogen. In embodiments, n is 1, in embodiments, n is 2. In embodiments, n is 3. In embodiments, n is 4. In embodiments, m is 1. In embodiments m is 2. In embodiments, m is 3. In embodiments, m is 4. In embodiments, m is 4 and n is 0. In embodiments, m is 0 and n is 4. In embodiments, m is 3 and n is 1. In embodiments, m is 1 and n is 3. In embodiments, m is 2 and n is 2. Alkyl and halogen are defined as above.

In embodiments, the sol-gel matrix is derived from a zirconium-containing precursor. In embodiments, the zirconium-containing precursor is zirconium tetrapropoxide. In embodiments, the zirconium containing precursor may have the general formula (IV): $(RO)_m ZrX_n$, where m and n are integers each independently selected from 0 to 4, where the total of m plus n is 4, R is an alkyl group and X is a halogen. In embodiments, n is 1, in embodiments, n is 2. In embodiments, n is 3. In embodiments, n is 4. In embodiments, m is 1. In embodiments m is 2. In embodiments, m is 3. In embodiments, m is 4. In embodiments, m is 4 and n is 0. In embodiments, m is 0 and n is 4. In embodiments, m is 3 and n is 1. In embodiments, m is 1 and n is 3. In embodiments, m is 2 and n is 2. Alkyl and halogen are defined as above.

In embodiments, the sol-gel matrix is derived from an aluminum-containing precursor. In embodiments, the aluminum-containing precursor comprises an aluminum oxide or aluminum alkoxide. In embodiments, the aluminum containing precursor may have the general formula (V): $(RO)_m AlX_n$, where m and n are integers each independently selected from 0 to 4, where the total of m plus n is 3 or 4 (i.e., aluminate), R is an alkyl group and X is a halogen. In embodiments, m is 4 and n is 0. In embodiments, n is 1, in embodiments, n is 2. In embodiments, n is 3. In embodiments, n is 4. In embodiments, m is 1. In embodiments m is 2. In embodiments, m is 3. In embodiments, m is 4. In embodiments, m is 0 and n is 4. In embodiments, m is 3 and n is 1. In embodiments, m is 1 and n is 3. In embodiments, m is 2 and n is 2. Alkyl and halogen are defined as above.

In embodiments, the sol-gel matrix is derived from two or more precursors selected from a silicon-containing precursor, a titanium-containing precursor, a zirconium-containing precursor, and an aluminum-containing precursor. In embodiments, the sol-gel matrix is prepared by combination of two metal precursors that include a mixture of compounds of formulas II and III, or formulas II and IV, or II and V, or III and IV, or III and V, or IV and V, each as defined above. In embodiments, the sol-gel matrix is prepared by a combination of three metal precursors that include compounds of formulas II, III, and IV, or formulas II, III and V, or formulas II, IV and V, or formulas III, IV, and V, each as defined above. In embodiments, the sol-gel matrix is prepared by a combination of four metal precursors that include compounds of formulas II, III, IV, and V. In embodiments, the sol-gel matrix is prepared by a combination of two different compounds of formula I, or a combination of two different compounds of formula II, or a combination of two different compounds of formula III, or a combination of two different compounds of formula IV, or a combination of two different compounds of formula V, each as defined above. In embodiments, any combination of any number of variations of compounds of formulas II, III, IV, and V may be used to prepare a sol-gel matrix for the compositions disclosed herein. The selection of particular metals and ligand combinations is guided by a desired target set of properties. As explained herein, for example, longer R alkyl groups may provide a sterically crowded environment resulting in a more porous, less dense structure. In addition to swellability, density, and porosity, another property of interest may be gel hardness and/or viscosity.

In embodiments, the sol-gel matrix is a composite material with an organic polymeric additive. In embodiments, the organic polymeric additive is selected from the group consisting of a chitosan, a polyacrylic acid, a polyvinylidene fluoride, a polyacrylic acid salt, a polyvinyl alcohol, a 2-(diethylamino)ethyl methacrylate, and a poly(methacrylic acid) salt. Where present, the amount of the organic polymeric additive may be in a range from about 4% to about 6% by volume of the composition. In embodiments, the amount of organic polymeric additive may be less than 4%, such as a non-zero amount up to about 4%, including 0.5% 1%, 2%, 3%, and 4%, including fractions thereof. In embodiments, the amount of organic polymeric additive may be more than 6%, such as from about 6% up to about 10%, including 6%, 7%, 8%, 9%, and 10%, including fractions thereof.

In embodiments, nicotine may be present in an amount from about 0.01% by weight of the composition to about 10% by weight of the composition. In embodiments, nicotine may be present from about 1% by weight of the composition up to about 5% by weight of the composition, such as about 1%, about 2%, about 3%, about 4% and about 5%, including fractions thereof. In embodiments, nicotine may be present from about 0.01% by weight of the composition to about 2% by weight of the composition, including 0.01%, 0.05%, 0.1%, 0.2%, 0.3%, 0.5%, 1%, 1.5%, and 2%, including any value in between and fractions thereof.

Although the benefits of sol-gel compositions allow for water as the sole carrier for nicotine, nonetheless, compositions disclosed herein may further comprise a humectant. The humectant may serve as a delivery aid for delivering nicotine to a user when the compositions herein are heated. In embodiments, the humectant comprises glycerin. In embodiments, the humectant comprises propylene glycol, glycerin, or combinations thereof. In embodiments, the propylene glycol, glycerin, or combinations thereof may comprise less than about 50% w/w of the composition, or may comprise less than 20% w/w of the composition, in other embodiments, or may comprise less than 10% w/w of the composition or may comprise less than 1% w/w of the composition, in further embodiments, or in still further embodiments, the humectant is free of one or more of propylene glycol and glycerin, though an alternative humectant is present. In embodiments, the humectant may include 1,3-propanediol. In embodiments, the humectant may include MCT oil. In embodiments, the humectant is free of both propylene glycol and glycerin. In one or more of the preceding embodiments, the glycerin may be vegetable glycerin.

In embodiments, the compositions disclosed herein may include an organic acid. In embodiments, the organic acid may serve the function of protonating nicotine to deliver nicotine in a salt form, provide organoleptic properties, or both. Organic acids include, without limitation, benzoic acid, pyruvic acid, salicylic acid, levulinic acid, succinic acid, citric acid, malic acid, formic acid, acetic acid, propionic acid, butyric acid, valeric acid, caproic acid, caprylic acid, capric acid, lauric acid, myristic acid, palmitic acid, stearic acid, oleic acid, linoleic acid, linolenic acid, phenylacetic acid, tartaric acid, lactic acid, malonic acid, fumaric acid, finnaric acid, gluconic acid, saccharic acid, sorbic acid, ascorbic acid, and malonic acid.

Organic acids may be present in the compositions in a range from about 0% by weight to about 25% by weight. In embodiments, the organic acids may be present in a non-zero amount up to about 25% by weight. In embodiments, the organic acids may be present in an amount from 1% by weight to about 25% by weight, or from about 1% by weight to about 10% by weight, or about 10% by weight to about 25% by weight, or about 1% by weight to about 5% by weight, including any sub-range in between and fractions thereof.

In embodiments, compositions disclosed herein may further comprise a variety of other flavorants (including the aforementioned organic acids). In embodiments, flavorants include nicotine salts such as nicotine acetate, nicotine oxalate, nicotine malate, nicotine isovalerate, nicotine lactate, nicotine citrate, nicotine phenylacetate and nicotine myristate. In embodiments, flavorants may include natural extracts, such as menthol, mint, classic Virginia tobacco, cinnamon, clove, ginger, pepper, or other synthetic flavors based on esters and aldehydes.

Flavorants may be present in the compositions in a range from about 0% by weight to about 10% by weight. In embodiments, the flavorants may be present in a non-zero amount up to about 10% by weight. In embodiments, the flavorants may be present in an amount from 1% by weight to about 5% by weight, or from about 1% by weight to about 2% by weight, or about 5% by weight to about 10% by weight, or about 1% by weight to about 2% by weight, including any sub-range in between and fractions thereof.

In embodiments, there are provided composition made by a process that includes providing a sol-gel matrix precursor and adding a solution of nicotine to the sol-gel matrix precursor, where the sol-gel matrix precursor, the solution of nicotine, or both comprise water. In embodiments, the solution of nicotine is neat, i.e., lacking solvent. In embodiments, the nicotine solution is aqueous. In embodiments, the nicotine solution comprises solvents that are humectants. In embodiments, the sol-gel matrix precursor may be reacted (i.e., polymerized via acid or base catalysis) first in the absence of nicotine and then nicotine may be loaded into the pre-fabricated sol-gel matrix. In embodiments nicotine is added during the polymerization. Similarly, any of the additional composition components, such as humectants, organic acids, and flavorants may be added before or after the sol-gel matrix is formed.

In embodiments, the nicotine solution, the sol-gel matrix precursor, or both may comprise an organic acid. In embodiments, the nicotine solution may comprise a flavorant. In embodiments, compositions may be the processes disclosed herein may include a process step of heating the sol-gel matrix precursor in the presence of at least one acid or base.

In embodiments, there are provided compositions that include a sol-gel matrix and nicotine or a salt thereof dispersed within the sol-gel matrix, where the composition has a melting point below 250° C. In embodiments, the composition has a melting point below 220° C. In embodiments, the composition has a melting point below 210° C. In embodiments, the composition has a melting point below 200° C.

In embodiments, the sol-gel matrix comprises a titanium oxide.

In embodiments, the composition has a density of about 0.5 g/cm$^3$ to about 1.5 g/cm$^3$.

In embodiments, the composition is aqueous.

In embodiments, the composition is in an e-liquid.

In embodiments, the sol-gel matrix is derived from a titanium-containing precursor.

In embodiments, the titanium-containing precursor is selected from the group consisting of titanium tetraethoxide, titanium tetraisopropoxide, titanium tetrabutoxide, titanium oxide sulfate hydrate, and titanium tetrachloride.

In embodiments, nicotine is present in an amount from about 0.01% by weight of the composition to about 10% by volume of the composition.

In embodiments, the composition further comprises an organic acid.

In embodiments, the organic acid is selected from the group consisting of benzoic acid, pyruvic acid, salicylic acid, levulinic acid, succinic acid, citric acid, malic acid, formic acid, acetic acid, propionic acid, butyric acid, valeric acid, caproic acid, caprylic acid, capric acid, lauric acid, myristic acid, palmitic acid, stearic acid, oleic acid, linoleic acid, linolenic acid, phenylacetic acid, tartaric acid, lactic acid, malonic acid, fumaric acid, finnaric acid, gluconic acid, saccharic acid, sorbic acid, and malonic acid.

In embodiments, the composition comprises a humectant.

In embodiments, the humectant comprises propylene glycol, glycerin, or combinations thereof.

In embodiments, the composition further comprises a flavorant.

In embodiments, there are provided cartridges for use in a device for delivery of nicotine or salt thereof to a user, the cartridge including a composition having a melting point below 250° C.

In embodiments, the cartridge is configured to dispense the composition in a device capable of heating the composition.

In embodiments, the cartridge is configured to place the composition in thermal communication with a heating element present in a device for delivery of nicotine to a user.

In embodiments, there are provided devices including a heating element configured to heat a composition having a melting point below 250° C.

In embodiments, the heating element is activated by taking a puff on the device at a mouthpiece, pressing a button, or combination thereof.

In embodiments, the heating element is in direct thermal contact with the composition.

In embodiments, devices may further include a wick, where in use, the device melts the composition.

In embodiments, the device is an e-cigarette.

IV. Composition Preparation

In embodiments, there are provided processes for preparing compositions disclosed herein comprising providing a sol-gel matrix precursor in a solvent, adding at least one acid or base to the sol-gel matrix precursor to form a mixture, where the mixture further comprises water, heating the mixture, and adding a nicotine solution to the heated mixture after a period of allowing the heated mixture to cool. In general, the process is carried out with stirring, though it is not strictly necessary to do so. It can be beneficial to assure homogeneity.

In embodiments, the nicotine solution comprises neat nicotine and an organic acid. In embodiments, the nicotine solution comprises a humectant. In embodiments, the humectant comprises propylene glycol, glycerol, or combinations thereof. In embodiments, the nicotine solution comprises an organic acid. In embodiments, the nicotine solution comprises a flavorant.

As described above, the compositions may be prepared by adding nicotine during polymerization of the sol-gel matrix precursor or after polymerization. The polymerization reaction may be acid or base catalyzed and generally employs water to induce the polymerization process, frequently referred to as the "sol-gel process." The sol-gel process commences by hydrolysis of a metal alkoxide or halide ligand which can then polymerize according to the reaction scheme shown below (shown with the tetralkoxide for convenience and by example only; those skilled in the art will appreciate that halide also hydrolyzes to provide a metal hydroxide intermediate):

1. hydrolysis:
   a. $M(OR)_4 + 2H_2O \rightarrow HO\text{-}M(OR)_3 + R\text{—}OH$; and/or
   b. $M(OR)_4 + 2H_2O \rightarrow MO_2 + 4R\text{—}OH$
2. polymerization
   a. $(OR)_3\text{-}M\text{-}OH + HO\text{—}Si\text{—}(OR)_3 \rightarrow [(OR)_3M\text{-}O\text{-}M(OR)_3] + H_2O$; and/or
   b. $(OR)_3\text{-}M\text{-}OR + HO\text{-}M\text{-}(OR)_3 \rightarrow [(OR)_3M\text{-}O\text{-}M(OR)_3] + R\text{—}OH$ where R is alkyl as defined above, and M is one or more metals.

In embodiments, the amount of water and catalyst present generally controls the extent of hydrolysis 1a versus 1b. Complete hydrolysis typically requires a large excess of water and/or the use of a strong hydrolysis catalyst as acetic acid or hydrochloric acid. In embodiments, similar hydrolysis chemistry can be performed under base catalyzed conditions. Intermediate species including $[(OR)_2\text{-}M\text{-}(OH)_2]$ or $[(OR)_3\text{-}M\text{-}(OH)]$ result from partial hydrolysis reactions.

Polymerization (2a and 2b) of intermediates result by combination of two partially hydrolyzed monomers to form a [M-O-M] backbone. Polymerization can be effective to provide a 1-, 2-, or 3-dimensional network of [M-O-M] backbones accompanied by the production of H—O—H and R—O—H species. Similar reaction as shown in 2a/2b continue to build the larger sol-gel polymer network. The mechanisms of hydrolysis and condensation, and the factors that bias the structure toward linear or branched structures are governed by complex parameters recognized by those skilled in the art.

In embodiments, the sol-gel process can be carried out to form films, beads, or bulk mass of sol-gel material. In embodiments the process may comprise forming a film of the sol-gel precursor on a substrate and performing the sol-gel reaction on the substrate. For example, the process can be carried out on tape and or mesh-like materials to provide a roll or spool of tape-like material comprising the sol-gel product.

V. Cartridge

In embodiments, there are provided cartridges for use in a device for releasing nicotine or salt thereof, the cartridge comprising the compositions disclosed herein. In embodiments, the cartridge delivers the composition to a heater in a device, thereby permitting delivery of nicotine to a user of the device.

The cartridges may have a variety of configurations depending on the form that the composition. For example, the configurations of the cartridges may vary depending on whether the composition is rendered in the form beads, films, solid gel mass, thought beads will be the most common form. In general, the cartridge can comprise a food-safe material. Cartridges can be made from a variety of materials including, but not limited to, metals, rigid plastics, flexible plastics, paper, paperboard, cardboard, and wax paper. Examples of some food-safe materials include aluminum, stainless steel, polyethylene terephthalate (PET), amorphous polyethylene terephthalate (APET), high density polyethylene (HDPE), polyvinyl chloride (PVC), low density polyethylene (LDPE), polypropylene, polystyrene, polycarbonate, and many varieties of paper products. In some cases, especially when the material is paper, the cartridge shell can be lined with a material or a food-safe material to prevent both drying of composition and to protect it from environmental degradation.

In practice, the cartridge is configured to integrate with a device for inhalation of nicotine or nicotine-containing vapor by a subject. In embodiments, the cartridge is formed and shaped for easy insertion into a heating chamber of a device. Moreover, the cartridge is formed and shaped to snugly fit into the cavity of the heating chamber for improved thermal conduction to heat the compositions in the cartridge.

The cartridge can be equipped with a lid, a cover, or a surface seal (e.g., a heat-sealable lidding film) configured to fully enclosed and hermetically seal the cartridge. A sealed cartridge can have the advantage of preserving freshness of the contents, and preventing spill of the materials within the cartridge during shipment or handling by the user.

In embodiments, a cartridge can be designed to be disposable and is thus suitable for a single use. In other embodiments, a cartridge can be configured to be reusable such that the same cartridge can be used and/or refilled multiple times. A cartridge can be provided (or sold to an end user) containing a single dose or multiple doses of a composition as disclosed herein. The type of product contained within the cartridge can be stamped or written on the cartridge, or indicated by the color, size, or shape of the cartridge. Alternatively, the cartridge can include circuitry implementing memory (e.g., electrically erasable programmable read-only memory (EEPROM) and/or the like) for storing at least a portion of the information identifying the contents of the cartridge. In embodiments, a cartridge can be filled and/or refilled by an end used with the compositions disclosed herein as well.

VI. Device

The compositions disclosed herein may be used with a vaporizer devices, which can also be referred to as vaporizers, electronic vaporizer devices, or e-vaporizer devices, can be used for delivery of an aerosol (for example, a vapor-phase and/or condensed-phase material suspended in a stationary or moving mass of air or some other gas carrier) containing one or more active ingredients by inhalation of the aerosol by a user of the vaporizing device. For example, electronic nicotine delivery systems (ENDS) include a class of vaporizer devices that are battery powered and that can be used to simulate the experience of smoking, but without burning of tobacco or other substances. In use of a vaporizer device, the user inhales an aerosol, colloquially referred to as "vapor," which can be generated by a heating element that vaporizes some portion of the compositions disclosed herein. The compositions may be provided within a cartridge (e.g., a separable part of the vaporizer device that contains the compositions) that includes an outlet (e.g., a mouthpiece) for inhalation of the aerosol by a user. In other embodiments, the compositions may be provided as part of a heating element in a device that requires no cartridge.

To receive the inhalable aerosol generated by a device, a user may, in certain examples, activate the device by taking a puff, by pressing a button, and/or by some other approach. A puff as used herein can refer to inhalation by the user in a manner that causes a volume of air to be drawn into the device such that the inhalable aerosol is generated by combining the volume of air with a vaporizable portion of the compositions disclosed herein.

An approach by which a vaporizer device generates an inhalable aerosol from the compositions involves heating the compositions in a vaporization chamber (e.g., a heater chamber) to cause the compositions to be converted to the gas (or vapor) phase. A vaporization chamber can refer to an area or volume in the vaporizer device within which a heat source (for example, a conductive, convective, and/or radiative heat source) causes heating of the compositions to produce a mixture of air and vaporized material to form a vapor for inhalation of the vaporizable material by a user of the vaporization device. In embodiments, the heat source is a heating element configured to heat a composition herein, to deliver nicotine or salt thereof to a user. In embodiments, the composition is disposed proximate to a heating element, thereby allowing heating of the composition from the inside of the gel material.

In embodiments, the compositions disclosed herein may be in surface contact with a heating element of a device to deliver nicotine or salt thereof to the user.

Vaporizer devices suitable for use with the compositions herein can include a power source (for example, a battery, which can be a rechargeable battery), and a controller (for example, a processor, circuitry, etc. capable of executing logic) for controlling delivery of heat to an atomizer to cause a composition to be converted from a condensed form (such as a solid, a liquid, a solution, a suspension, a part of an at least partially unprocessed plant material, etc.) to the gas phase. The controller can be part of one or more printed circuit boards (PCBs) consistent with certain implementations of the current subject matter. After conversion of the composition to the gas phase, at least some of the composition in the gas phase can condense to form particulate matter in at least a partial local equilibrium with the gas phase as part of an aerosol, which can form some or all of an inhalable dose provided by the vaporizer device during a user's puff or draw on the vaporizer device. It should be appreciated that the interplay between gas and condensed phases in an aerosol generated by a vaporizer device can be complex and dynamic, due to factors such as ambient temperature, relative humidity, chemistry, flow conditions in airflow paths (both inside the vaporizer and in the airways of a human or other animal), and/or mixing of the composition in the gas phase or in the aerosol phase with other air streams, which can affect one or more physical parameters of an aerosol. In some vaporizer devices, and particularly for vaporizer devices configured for delivery of the compositions, the inhalable dose can exist predominantly in the gas phase (for example, formation of condensed phase particles can be very limited).

The heating element can be activated in association with a user puffing (i.e., drawing, inhaling, etc.) on a mouthpiece of the vaporizer device to cause air to flow from an air inlet, along an airflow path that passes the atomizer (i.e., wicking element and heating element). Optionally, air can flow from an air inlet through one or more condensation areas or chambers, to an air outlet in the mouthpiece. Incoming air moving along the airflow path moves over or through the atomizer, where composition in the gas phase is entrained into the air. The heating element can be activated via the controller, which can optionally be a part of a vaporizer body causing current to pass from the power source through a circuit including the resistive heating element, which is optionally part of a vaporizer cartridge. The entrained composition in the gas phase can condense as it passes through the remainder of the airflow path such that an inhalable dose of the composition in an aerosol form can be delivered from the air outlet (for example, the mouthpiece) for inhalation by a user.

Activation of the heating element can be caused by automatic detection of a puff based on one or more signals generated by one or more of a sensor. The sensor and the signals generated by the sensor can include one or more of: a pressure sensor or sensors disposed to detect pressure along the airflow path relative to ambient pressure (or optionally to measure changes in absolute pressure), a motion sensor or sensors (for example, an accelerometer) of the vaporizer device, a flow sensor or sensors of the vaporizer device, a capacitive lip sensor of the vaporizer device, detection of interaction of a user with the vaporizer device via one or more input devices (for example, buttons or other tactile control devices of the vaporizer device), receipt of signals from a computing device in communication with the vaporizer device, and/or via other approaches for determining that a puff is occurring or imminent.

The vaporizer device suitable for implementations along with the compositions of current subject matter can be configured to connect (such as, for example, wirelessly or via a wired connection) to a computing device (or optionally two or more devices) in communication with the vaporizer device. To this end, the controller can include communication hardware. The controller can also include a memory. The communication hardware can include firmware and/or can be controlled by software for executing one or more cryptographic protocols for the communication.

In some implementations, the vaporizer body includes the controller, the power source (for example, a battery), one or more sensors, charging contacts (such as those for charging the power source), a seal, and a cartridge receptacle configured to receive the vaporizer cartridge for coupling with the vaporizer body through one or more of a variety of attachment structures. In some examples, the vaporizer cartridge includes the reservoir for containing the composition, and the mouthpiece has an aerosol outlet for delivering an inhalable dose to a user. The vaporizer cartridge can include the atomizer having a wicking element and a heating element. Alternatively, one or both of the wicking element and the heating element can be part of the vaporizer body. In implementations in which any part of the atomizer (i.e., heating element and/or wicking element) is part of the vaporizer body, the vaporizer device can be configured to supply composition from the reservoir in the vaporizer cartridge to the part(s) of the atomizer included in the vaporizer body.

The devices herein may be e-cigarettes, in embodiments. An electronic cigarette for generating an inhalable aerosol comprising a storage means for the compositions disclosed herein, a heater, a battery, and a mouthpiece. In embodiments, the storage means comprises directly loading (adhering) the compositions disclosed herein to the heater. In embodiments, the storage means comprises a container that can dispense the composition placing it in direct contact with the heater. In embodiments, the storage means can accommodate non-direct contact with the heater such as when heating is effected by convection, induction microwave, or radiative heating.

In embodiments there are provided devices comprising a heating element configured to heat a composition herein, to deliver nicotine or salt thereof to a user. In embodiments, the composition is disposed proximate to a heating element, thereby allowing heating of the composition from the inside of the gel material. For example, the compositions disclosed herein may be disposed conformally about any shaped heating element including, without limitation, coils, rods, mesh material and the like to allow, in embodiments, the gel to be heated from the inside.

In embodiments, there are provided methods of delivering nicotine to a user comprising operating an electronic cigarette by a user wherein the electronic cigarette comprises a composition as disclosed herein, and inhaling an aerosol generated from the composition heated by the electronic cigarette. In embodiments, the composition is heated to a temperature between about 100° C. to about 300° C. In embodiments, the composition is heating from about 150° C. to about 250° C. In embodiments, there are provided methods that include self-administering to a user a dose of nicotine or salt thereof by activating a device as described above.

VII. EXAMPLES

Reagents: The following reagents are used in the Examples that follow: Tetraethoxysilane (TEOS, CAS #78-10-4), Nicotine (CAS #54-11-5), Benzoic acid (crystalline, CAS #65-85-0), Ethanol (CAS #64-17-5), Hydrochloric acid (1.0 M, CAS #7647-01-0), Deionized water (CAS #7732-18-5), and Virginia tobacco (proprietary, 5% nicotine) e-liquid.

Example 1

This Example shows the preparation of a sol-gel nicotine composition comprising an e-liquid comprising propylene glycol and glycerin, in accordance with embodiments herein.

Step 1: 30% Vol. Tetraethoxysilane (TEOS) Formulation Preparation 3 mL of TEOS was added into a 20 mL scintillation vial. 3 mL ethanol was added into the vial. The mixture was stirred thoroughly. 4 mL of water was slowly added into the vial, mixing thoroughly as more water is added. Once the mixture was homogenously mixed, (dropwise) 100 µL of benzoic acid solution (1.0 M in water) and 100 µL of HCl (1.0 M) was slowly added, stirring the solution between drop additions. The resulting solution was heated at 60° C. on a hot plate with a stir bar at 500 RPM for two hours and then allowed to cool before use.

Step 2: Nicotine Loading and Complete Polymerization 7.5 mL of Virginia Tobacco (5% nicotine) e-liquid was added into a 20 mL scintillation vial. 2.5 mL of 30% Vol. TEOS Formulation (prepared above) was then added into the vial, ensuring that the formulation is at room temperature. This mixture was mixed thoroughly until the solution was homogenous. The scintillation vial was sealed with a cap and the solution allowed to complete polymerizing overnight.

Example 2

This Example shows the preparation of a sol-gel nicotine composition comprising 5% nicotine without the use of propylene glycol and glycerin, in accordance with embodiments herein.

Step 1. 7.5% Vol. Tetraethoxysilane (TEOS) Formulation Preparation 0.7 mL of TEOS was added into a 20 mL scintillation vial. Then, 4 mL ethanol was added into the vial and mixed thoroughly. 5.3 mL of water was slowly added into the vial, mixing thoroughly as more water is added. Once the mixture is homogenously mixed, slowly add (dropwise) 100 µL of benzoic acid solution (1.0 M in water) and 100 µL of HCl (1.0 M), stirring the solution between drop additions. The solution was heated at 60° C. on a hot plate with a stir bar at 500 RPM for two hours and then allowed to cool before use.

Step 2: Benzoic Acid Solution Preparation 5 mL of liquid nicotine was heated with a stir bar in a 20 mL scintillation vial at 80° C. 3.8 mg of benzoic acid crystals was added to the scintillation vial with stirring at 500 RPM and the solution was allowed to mix for one hour until all the benzoic crystals have completely dissolved and then the solution was allowed to cool before use.

Step 3: Nicotine Loading and Complete Polymerization 9.5 mL of 7.5% Vol. TEOS Formulation (prepared above step 1) was added into a 20 mL scintillation vial, ensuring that the formulation was at room temperature. 0.5 mL of benzoic acid solution (prepared above step 2) was added into the vial and mixed thoroughly until the solution was homogenous. The scintillation vial was capped and the solution allowed to complete polymerization overnight.

Example 3

This Example shows the preparation and characterization of titanium-based sol-gels, in accordance with embodiments herein.

75% e-liquid formulation general procedure: 6 mL Virginia Tobacco (VT) 5% e-liquid was added into a 20 mL scintillation vial. The e-liquid was stirred at 60 Celsius for 10 minutes at 500 RPM. 2 mL of a titanium alkoxide solution was added very slowly dropwise and stirring continued for another 10 minutes until the mixture was homogenous. Next, 800 microliters of water was added very slowly dropwise while stirring, then 400 microliters of HCl (1.0 M in water) was added very slowly dropwise while stirring. Stirring was continued for 30 seconds and the stir bar quickly removed (because crosslinking is so fast leaving the stir bar in might get it stuck in the gel). The gel was left overnight to fully crosslink.

A 90% e-liquid formulation procedure was carried out in the same manner.

The above general procedure was carried out with alkoxide starting materials as follows: titanium ethoxide, titanium isopropoxide, titanium butoxide, and zirconium isopropoxide. Data and observations are summarized in Table 1 below for different mixtures of starting metal alkoxide amounts mixed with a 5% Virginia Tobacco liquid (VT 5%, in propyleneglycol/vegetable glycerin).

TABLE 1

| Alkoxide Solution | Alkoxide (% vol) | VT 5% (% vol) | Gel Observations |
|---|---|---|---|
| Titanium Ethoxide | 25 | 75 | Transparent, hard and brittle Slowly melts like butter when heated and generates large amount of vapor once liquified |
| | 10 | 90 | Opaque, soft and jam-like Quickly melts like butter when heated and generates very large amount of vapor once liquified |
| Titanium Isopropoxide | 25 | 75 | Transparent, hard and brittle Slowly melts like butter when heated and generates large amount of vapor once liquified |
| | 10 | 90 | Opaque, soft and jam-like Quickly melts like butter when heated and generates very large amount of vapor once liquified |
| Titanium Butoxide | 25 | 75 | Transparent, hard and brittle Slowly melts like butter when heated and generates large amount of vapor once liquified |
| | 10 | 90 | Opaque, soft and jam-like Quickly melts like butter when heated and generates very large amount of vapor once liquified |
| Titanium Oxysulfate | 25 | 75 | Difficult to dissolve titanium powder; did not gel |
| | 10 | 90 | Difficult to dissolve titanium powder; did not gel |
| Zirconium Propoxide | 25 | 75 | Hard and lumpy, separates out of e-liquid Poor vapor generation |
| | 10 | 90 | Lumpy, soft and jam-like, slight separation of metal oxide |

TABLE 1-continued

| Alkoxide Solution | Alkoxide (% vol) | VT 5% (% vol) | Gel Observations |
|---|---|---|---|
| | | | Vapor generation comparable to TEOS generated silane gel |

As indicated in Table 1, changing the oxide percent volume can change the properties of the gel, as well as vapor generation. Titanium gels generally generate more vapor than zirconium-based gel.

The titanium-based gels displayed a unique physical property in that it liquified at operating temperatures of a conventional electronic vaporization device, creating an expandable area of liquid that could spread across a heater surface. This property will allow efficient heat transfer and vaporization, thereby allowing for a smaller heater size, impact energy consumption, battery life, and device size and design. Thus, the titanium-based gel liquifies maximizing the heater surface contact as it liquifies slowly at heating surface. The melting temperature is readily optimized by selection of, inter alia, the sol-gel starting materials. The ability to liquify also allows the gel to be combined with wicking materials in an electronic vaporization device.

What is claimed is:

1. A composition comprising:

a sol-gel matrix comprising a metal oxide; and nicotine or a salt thereof dispersed within the sol-gel matrix, wherein the sol-gel matrix is derived from a titanium-containing precursor selected from the group consisting of titanium tetraethoxide and titanium tetrabutoxide.

2. The composition of claim 1, wherein the sol-gel matrix further comprises an organic polymeric additive.

3. The composition of claim 2, wherein the organic polymeric additive is selected from the group consisting of a chitosan, a polyacrylic acid, a polyvinylidene fluoride, a polyacrylic acid salt, a polyvinyl alcohol, a 2-(diethylamino) ethyl methacrylate, and a poly(methacrylic acid) salt.

4. The composition of claim 1, wherein the sol-gel matrix further comprises an organic acid.

5. The composition of claim 4, wherein the organic acid is selected from the group consisting of benzoic acid, pyruvic acid, salicylic acid, levulinic acid, succinic acid, citric acid, malic acid, formic acid, acetic acid, propionic acid, butyric acid, valeric acid, caproic acid, caprylic acid, capric acid, lauric acid, myristic acid, palmitic acid, stearic acid, oleic acid, linoleic acid, linolenic acid, phenylacetic acid, tartaric acid, lactic acid, malonic acid, fumaric acid, finnaric acid, gluconic acid, saccharic acid, sorbic acid, and malonic acid.

6. The composition of claim 1, wherein the sol-gel matrix further comprises a humectant, a flavorant, or both.

7. The composition of claim 6, wherein the humectant comprises propylene glycol, glycerin, or any combination thereof.

8. A composition made by a process comprising:

providing a sol-gel matrix precursor in a solvent, wherein the sol-gel matrix precursor comprises a metal oxide and is derived from a titanium-containing precursor selected from the group consisting of titanium tetraethoxide and titanium tetrabutoxide; and adding a solution of nicotine to the sol-gel matrix precursor;

wherein the sol-gel matrix precursor, the solution of nicotine, or both comprise water.

9. The composition of claim 8, further comprising heating the sol-gel matrix precursor in the presence of at least one acid or base prior to adding the solution of nicotine.

10. The composition of claim 9, wherein the heated sol-gel matrix precursor is allowed to cool prior to adding the solution of nicotine.

11. The composition of claim 2, wherein an amount of the organic polymeric additive is in a range from about 4% to about 6% by volume of the composition.

12. The composition of claim 7, wherein the propylene glycol, glycerin, or combinations thereof comprises less than 50% w/w of the composition.

13. The composition of claim 7, wherein the propylene glycol, glycerin, or combinations thereof comprises less than 10% w/w of the composition.

14. The composition of claim 7, wherein the propylene glycol, glycerin, or combinations thereof comprises less than 1% w/w of the composition.

15. The composition of claim 1, wherein the composition has a melting point below 250° C.

16. The composition of claim 1, wherein the sol-gel matrix has a density of 0.5 $g/cm^3$ to 1.5 $g/cm^3$.

17. The composition of claim 1, wherein nicotine is present in an amount from 0.01% by weight of the composition to about 10% by weight of the composition.

18. The composition of claim 8, wherein the sol-gel matrix precursor, the solution of nicotine, or both comprise an organic acid.

19. A process comprising:

providing a sol-gel matrix precursor in a solvent, wherein the sol-gel matrix precursor comprises a metal oxide and is derived from a titanium-containing precursor selected from the group consisting of titanium tetraethoxide and titanium tetrabutoxide;

adding at least one acid or base to the sol-gel matrix precursor to form a mixture;

wherein the mixture further comprises water;

heating the mixture; and adding a nicotine solution to the heated mixture after a period of allowing the heated mixture to cool.

* * * * *